US011722317B2

(12) United States Patent
Barrett et al.

(10) Patent No.: US 11,722,317 B2
(45) Date of Patent: Aug. 8, 2023

(54) SYSTEM AND METHOD FOR OBTAINING A SIGNED CERTIFICATE

(71) Applicant: BlackBerry Limited, Waterloo (CA)

(72) Inventors: Stephen John Barrett, Haywards Heath (GB); James Robert Alfred, Oakville (CA); Ming Chee Tsang, Mississauga (CA); Michael Peter Montemurro, Toronto (CA); Adam Richard Schieman, Toronto (CA); Neil Patrick Adams, Waterloo (CA); Robert Joseph Lombardi, Hamilton (CA)

(73) Assignee: BlackBerry Limited, Waterloo (CA)

( * ) Notice: Subject to any disclaimer, the term of this patent is extended or adjusted under 35 U.S.C. 154(b) by 79 days.

(21) Appl. No.: 17/130,411

(22) Filed: Dec. 22, 2020

(65) Prior Publication Data

US 2022/0200810 A1    Jun. 23, 2022

(51) Int. Cl.
*H04L 9/32* (2006.01)
*H04L 9/08* (2006.01)

(52) U.S. Cl.
CPC .......... *H04L 9/3263* (2013.01); *H04L 9/0825* (2013.01); *H04L 9/0866* (2013.01); *H04L 9/3247* (2013.01)

(58) Field of Classification Search
CPC ... H04L 9/3263; H04L 9/0825; H04L 9/0866; H04L 9/3247
See application file for complete search history.

(56) References Cited

U.S. PATENT DOCUMENTS

| 7,948,925 | B2* | 5/2011 | Miyabayashi | H04W 12/06 370/480 |
| 9,749,131 | B2* | 8/2017 | Baghdasaryan | .... H04L 63/0442 |
| 10,728,044 | B1* | 7/2020 | Melo | ..................... H04L 63/083 |
| 10,839,104 | B2* | 11/2020 | Balzer | ................. H04L 63/0421 |

(Continued)

FOREIGN PATENT DOCUMENTS

WO    WO03007527    1/2003

OTHER PUBLICATIONS

Marc Eisenstadt et al: "Covid-19 Antibody Test/ Vaccination Certification: There's an appl for that" in IEEE Open Journal of Engineering in Medicine and Biology, vol. 1, pp. 148-155, 2020 doi: 10.1109/OJEMB.2020.2999214.

(Continued)

*Primary Examiner* — John B King
*Assistant Examiner* — Alex D Carrasquillo
(74) *Attorney, Agent, or Firm* — Rowand LLP

(57) ABSTRACT

A computer-implemented method comprises sending, to a first device, a request for a signed certificate, the request for the signed certificate comprising a signed hash of data associated with a user, a corresponding public key of the user, and the data associated with the user; sending, to a second device different from the first device, a request for the signed certificate, the request comprising information to retrieve the signed certificate; and obtaining, from the second device, a signed certificate, the signed certificate comprising the public key of the user, the hash of the data associated with the user, and information indicating a health status of the user, the data associated with the user being absent from the signed certificate.

18 Claims, 14 Drawing Sheets

(56) References Cited

U.S. PATENT DOCUMENTS

| | | | | |
|---|---|---|---|---|
| 10,885,170 | B1* | 1/2021 | Maliani | H04L 9/0643 |
| 10,923,216 | B1* | 2/2021 | White | H04L 9/3231 |
| 2006/0155855 | A1* | 7/2006 | Hamai | H04L 63/0823 |
| | | | | 709/227 |
| 2008/0133273 | A1* | 6/2008 | Marshall | G06Q 10/10 |
| | | | | 705/3 |
| 2011/0313928 | A1* | 12/2011 | Blonchek | G06Q 10/06 |
| | | | | 705/51 |
| 2015/0379198 | A1* | 12/2015 | Tambasco, Jr. | G16H 10/60 |
| | | | | 705/3 |
| 2019/0189254 | A1* | 6/2019 | Roennow | H04L 9/0637 |
| 2019/0208354 | A1* | 7/2019 | Raduchel | H04W 12/06 |
| 2020/0169406 | A1* | 5/2020 | Liu | H04L 9/3247 |
| 2020/0227160 | A1* | 7/2020 | Youngblood | G16H 40/67 |
| 2021/0158292 | A1* | 5/2021 | Daub | G16H 10/60 |

OTHER PUBLICATIONS

Abhishek Singh et al: "Verifiable Proof of Health using Public Key Cryptography" arXiv:2012.02885v1 [cs.CR] Dec. 4, 2020.
Extended European Search Report, EP Application No. 21216101.2 dated May 13, 2022.

* cited by examiner

SYSTEM AND METHOD FOR OBTAINING A SIGNED CERTIFICATE

TECHNICAL FIELD

The present disclosure relates to systems and methods for obtaining a signed certificate.

BACKGROUND

Businesses and other establishments may wish to check the health status of a visitor or guest prior to allowing them to enter. For example, a business may wish to ensure that the visitor does not have a particular virus or disease prior to allowing the visitor to enter.

In some instances, a business may check the temperature of a visitor prior to allowing the visitor to enter. Taking the temperature of the visitor may not accurately detect whether or not the visitor has a particular virus or disease.

In some instances, a business may check the vaccination records of a visitor prior to allowing the visitor to enter. Checking vaccination records may be inaccurate as the vaccination records may be out of date. It may also be difficult to determine that the vaccination records are in fact the vaccination records of the visitor or if they are fraudulent in that the vaccination records are that of another person.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
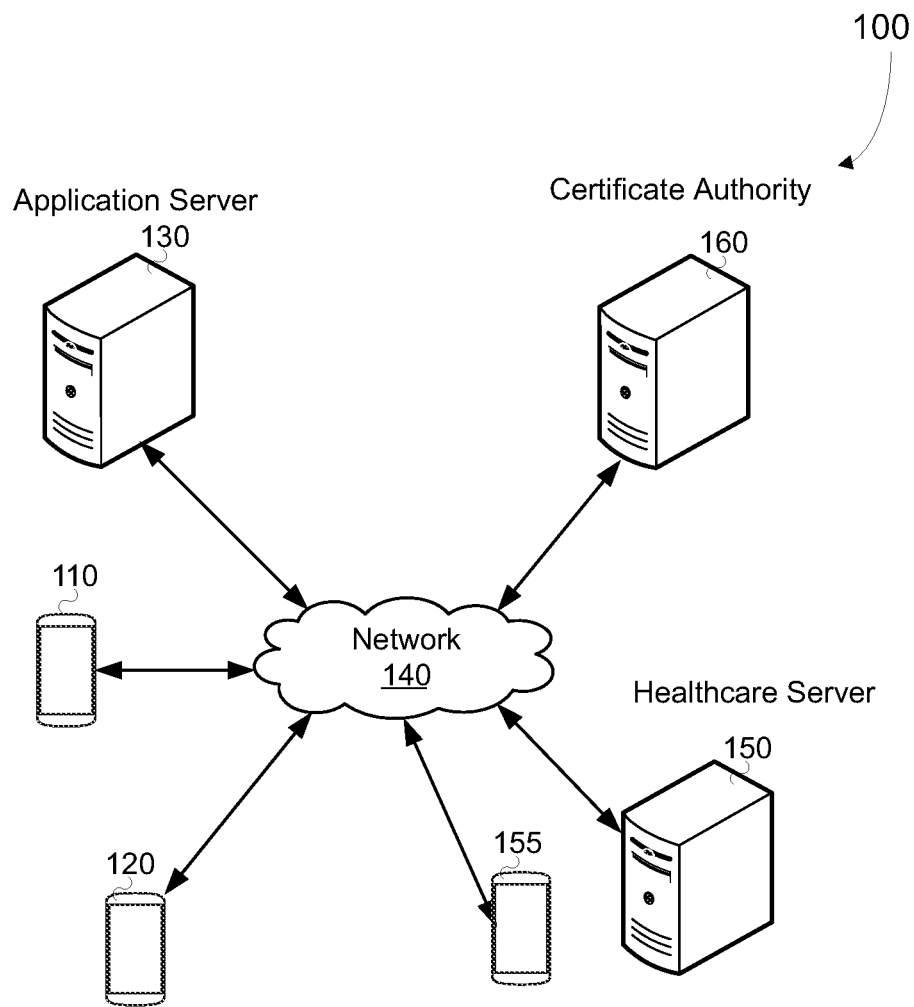
FIG. 1 is a schematic operation diagram illustrating an operating environment of an example embodiment.

Accordingly, in one aspect there is provided a computer-implemented method comprising sending, to a first device, a request for a signed certificate, the request for the signed certificate comprising a signed hash of data associated with a user, a corresponding public key of the user, and the data associated with the user; sending, to a second device different from the first device, a request for the signed certificate, the request comprising information to retrieve the signed certificate; and obtaining, from the second device, a signed certificate, the signed certificate comprising the public key of the user, the hash of the data associated with the user, and information indicating a health status of the user, the data associated with the user being absent from the signed certificate.

In one or more embodiments, the data associated with the user corresponds to partial personally identifiable information.

In one or more embodiments, the partial personally identifiable information corresponds to information available on an identity document of the user.

In one or more embodiments, the data associated with the user corresponds to an obfuscated or deformed image of the user.

In one or more embodiments, the information to retrieve the signed certificate comprises either the public key of the user or a hash of the public key of the user.

In one or more embodiments, the method further comprises receiving, from the first device, a unique certificate identification number, and wherein the information to retrieve the certificate corresponds to the unique certificate identification number.

In one or more embodiments, the data associated with the user and the signed certificate are provided by a user device to a relying party device.

In one or more embodiments, the relying party device displays the data associated with the user and the information indicating the health status of the user on a display screen thereof.

In one or more embodiments, the relying party device generates a nonce, displays the nonce on the display screen thereof, and sends the nonce to the user device.

In one or more embodiments, the nonce is encrypted with the public key of the user by the relying party device.

In one or more embodiments, the user device decrypts the nonce using a private key of the user associated with the public key of the user, and displays the nonce on a display screen thereof, and wherein when the data associated with a user corresponds to the obfuscated or deformed image of the user, the user device further displays a corresponding non-obfuscated or non-deformed image of the user.

In one or more embodiments, the nonce is displayed at corresponding locations on the display screens of the relying party device and the user device.

In one or more embodiments, the information indicating a health status of the user relates to one of an immunisation status or a vaccination status.

In one or more embodiments, the second device is one of a server comprising signed certificates provided by a certificate authority or a server managed by a certificate authority.

In one or more embodiments, the unique certificate identification number is received from the first device when the signed hash is validated via a signature verification process.

In one or more embodiments, the first device is one of a server managed by a healthcare entity or a mobile device comprising a healthcare application.

According to another aspect there is provided a computer-implemented method comprising obtaining a public key of a user, a hash of data associated with the user, without having access to the data associated with the user, and information indicating a health status of the user, from a communication with a first device; and signing a certificate comprising the public key of the user, the hash of the data associated with the user, and the information indicating the health status of the user, the signing delivering a signed certificate, the data associated with the user being absent from the signed certificate.

In one or more embodiments, the method further comprises transmitting to the first device a notification subsequent to the signing, wherein the notification informs of an availability of the signed certificate.

According to another aspect there is provided a system comprising at least one processor; and a memory coupled to the at least one processor and storing instructions that, when executed by the at least one processor, configure the at least one processor to send, to a first device, a request for a signed certificate, the request for the signed certificate comprising a signed hash of data associated with a user, a corresponding public key of the user, and the data associated with the user; send, to a second device different from the first device, a request for the signed certificate, the request comprising information to retrieve the signed certificate; and obtain, from the second device, a signed certificate, the signed certificate comprising the public key of the user, the hash of the data associated with the user, and information indicating a health status of the user, the data associated with the user being absent from the signed certificate.

According to another aspect there is provided a system comprising at least one processor; and a memory coupled to the at least one processor and storing instructions that, when executed by the at least one processor, configure the at least one processor to obtain a public key of a user, a hash of data associated with the user, without having access to the data associated with the user, and information indicating a health status of the user, from a communication with a first device; and sign a certificate comprising the public key of the user, the hash of the data associated with the user, and the information indicating the health status of the user, the signing delivering a signed certificate, the data associated with the user being absent from the signed certificate.

According to another aspect there is provided a computer-implemented method comprising generating a public and private key pair; obtaining image data associated with a user, the image data including an image of the user and a corresponding obscured image of the user; generating a hash of the corresponding obscured image of the user and signing the hash with the private key; sending, to a healthcare communication device, a request for a signed certificate, the request for the signed certificate including at least the signed hash of the corresponding obscured image, the public key, the corresponding obscured image and information related to the health status of the user; receiving, from the healthcare communication device, a unique certificate identification number; sending, to a server, a request for the signed certificate, the request including the unique certificate identification number; and obtaining, from the server, the signed certificate, the signed certificate including the certificate identification number, the public key, the hash of the corresponding obscured image, and information indicating the health status of the user.

In one or more embodiments, the corresponding obscured image of the user and the signed certificate are provided by the user device to a relying party device.

In one or more embodiments, the relying party device displays the corresponding obscured image of the user and the information indicating the health status of the user on a display screen thereof.

In one or more embodiments, the relying party device generates a nonce, displays the nonce on the display screen thereof, and sends the nonce to the user device.

In one or more embodiments, the nonce is encrypted with the public key by the relying party device.

In one or more embodiments, the user device decrypts the nonce using the private key and displays the image of the user and the nonce on a display screen thereof.

In one or more embodiments, the nonce is displayed at corresponding locations on the display screens of the relying party device and the user device.

In one or more embodiments, the certificate is generated by a third party and signed by an authenticating entity.

In one or more embodiments at least one of the image and the corresponding obscured image are approved by a third party.

In one or more embodiments, the signed certificate is one of an immunisation certificate or a vaccination certificate, and when the signed certificate is the immunisation certificate the health status indicates an immunisation status of the user and when the signed certificate is the vaccination certificate the health status indicates a vaccination status of the user.

In one or more embodiments, the method further comprises obtaining an image of the user; and generating the corresponding obscured image of the user by modifying at least a portion of the obtained image.

In one or more embodiments, the healthcare communication device sends the certificate signing request to a certificate authority and the certificate authority signs the certificate without storing data related to the identity of the user.

According to another aspect there is provided a system comprising at least one processor; and a memory coupled to the at least one processor and storing instructions that, when executed by the at least one processor, configure the at least one processor to generate a public and private key pair; obtain image data associated with a user, the image data including an image of the user and a corresponding obscured image of the user; generate a hash of the corresponding obscured image of the user and signing the hash with the private key; send, to a healthcare communication device, a request for a signed certificate, the request for the signed certificate including at least the signed hash of the corresponding obscured image, the public key, the corresponding obscured image and information related to the health status of the user; receive, from the healthcare communication device, a unique certificate identification number; send, to a server, a request for the signed certificate, the request including the unique certificate identification number; and obtain, from the server, the signed certificate, the signed certificate including the certificate identification number, the public key, the hash of the corresponding obscured image, and information indicating the health status of the user.

In one or more embodiments, the corresponding obscured image of the user and the at least the portion of verified health status data are provided to a relying party device.

In one or more embodiments, the relying party device displays the corresponding obscured image of the user and the information indicating the health status of the user on a display screen thereof.

In one or more embodiments, the relying party device generates a nonce, displays the nonce on the display screen thereof, and sends the nonce to the user device.

In one or more embodiments, the nonce is encrypted with the public key by the relying party device.

In one or more embodiments, the user device decrypts the nonce using the private key and displays the image of the user and the nonce on a display screen thereof.

In one or more embodiments, the nonce is displayed at corresponding locations on the display screens of the relying party device and the user device.

According to another aspect there is provided a non-transitory computer readable storage medium comprising computer-executable instructions which, when executed, configure a processor to generate a public and private key pair; obtain image data associated with a user, the image data including an image of the user and a corresponding obscured image of the user; generate a hash of the corresponding obscured image of the user and signing the hash with the private key; send, to a healthcare communication device, a request for a signed certificate, the request for the signed certificate including at least the signed hash of the corresponding obscured image, the public key, the corresponding obscured image and information related to the health status of the user; receive, from the healthcare communication device, a unique certificate identification number; send, to a server, a request for the signed certificate, the request including the unique certificate identification number; and obtain, from the server, the signed certificate, the signed certificate including the certificate identification number, the public key, the hash of the corresponding obscured image, and information indicating the health status of the user.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As shown, mobile devices 110, 120 and a server 130 communicate via a network 140. The mobile device 110 may be referred to as a user device 110 and the mobile device 120 may be referred to as a relying party device 120.

The server 130 may be referred to as an application server 130. The application server 130 is associated with a mobile application (such as a web or mobile application) that is resident on the user device 110 and/or the relying party device 120. The mobile application may be, for example, a health passport application. As will be described in more detail below, the health passport application may be configured to submit a request for a signed certificate that includes health status data for a user and the server 130 may be used to store one or more signed certificates in memory thereof.

The system 100 also includes a healthcare data server 150 and a healthcare communication device 155. The healthcare data server 150 and the healthcare communication device 155 may be associated with one or more healthcare providers and may be configured to generate health status data for a user. The healthcare data server 150 and/or the healthcare communication device 155 may communicate with one or more external servers that may provide data such as test result data to the healthcare data server 150. The healthcare data server 150 and/or the healthcare communication device 155 may receive a certificate signing request from the user device 110 and may generate or otherwise store information related to the health status of the user. The test result data may be included with the health status data. The health status data for the user may be generated by an operator associated with the healthcare provider. An operator of the healthcare communication device 155 may be for example a physician and the user may be a patient of the physician.

As will be described, the healthcare data server 150 and/or the healthcare communication device 155 may be configured to receive image data of the user from the user device 110. The image data of the user may include an image of the user and a corresponding obscured image of the user.

The healthcare data server 150 and/or the healthcare communication device 155 may be a registration authority (RA) which generates a certificate signing request.

The system 100 also includes a certificate authority server 160. The certificate authority server 160 may be associated with an authenticating entity and may be configured to receive a certificate signing request from the healthcare data server 150 and/or the healthcare communication device 155. As will be described in more detail, certificate signing may require verifying that the registration authority (RA) is authorized and authentic. The certificate authority server 160 may include a server comprising signed certificates provided by a certificate authority or a server managed by a certificate authority.

When it is determined that the RA is authorized and authentic, the certificate authority server 160 may generate the requested certificate. The certificate may include the certificate identification number, the public key of the user, a hash of an obscured photo of the user, and health status data of the user. For example, the certificate may be an immunisation certificate and as such may include the immunisation status of the user (immune/not immune), a start date and an end date of the validity of the immunisation, and the disease that the user is immune to (for example, Covid-19). As another example, the certificate may be a vaccination certificate and as such may include information indicating that the user has been vaccinated for one or more particular diseases.

The user device 110, the relying party device 120, the application server 130, the healthcare data server 150 and the certificate authority server 160 may be in geographically disparate locations. Put differently, the user device 110, the relying party device 120, the application server 130, the healthcare data server 150 and the certificate authority server 160 may be remote from one another.

The user device 110, the relying party device 120, the application server 130, the healthcare data server 150, the healthcare communication device 155 and the certificate authority server 160 are computer systems. The user device 110, the relying party device 120 and/or the healthcare communication device 155 may take a variety of forms including, for example, a mobile communication device such as a smartphone, a tablet computer, a wearable computer such as a head-mounted display or smartwatch, a laptop or desktop computer, or a computing device of another type.

The network 140 is a computer network. In some embodiments, the network 140 may be an internetwork such as may be formed of one or more interconnected computer networks. For example, the network 140 may be or may include an Ethernet network, a wireless network, a cloud network, a telecommunications network or the like.

Figure 2:
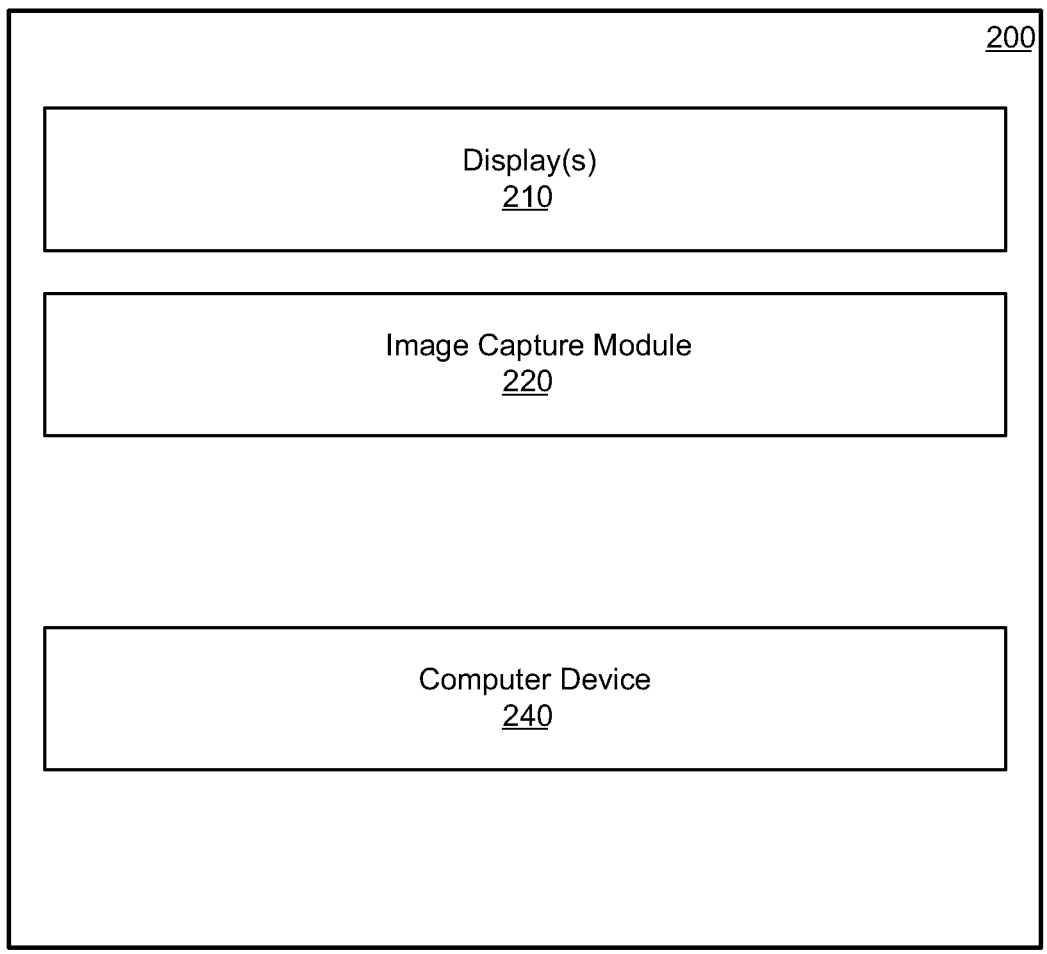
FIG. 2 is a simplified schematic diagram showing components of a computing device.

FIG. 2 is a simplified schematic diagram showing components of an exemplary computing device 200. The user device 110, the relying party device 120 and/or the healthcare communication device 155 may be of the same type as computing device 200. The computing device 200 may include modules including, as illustrated, for example, one or more displays 210, an image capture module 220, and a computer device 240.

The one or more displays 210 are a display module. The one or more displays 210 may be used to display screens of a graphical user interface that may be used, for example, to communicate with the application server 130 and/or the healthcare data server 150 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The computer device 240 is in communication with the one or more displays 210, and the image capture module 220. The computer device 240 may be or may include a processor which is coupled to the one or more displays 210 and/or the image capture module 220.

Figure 3:
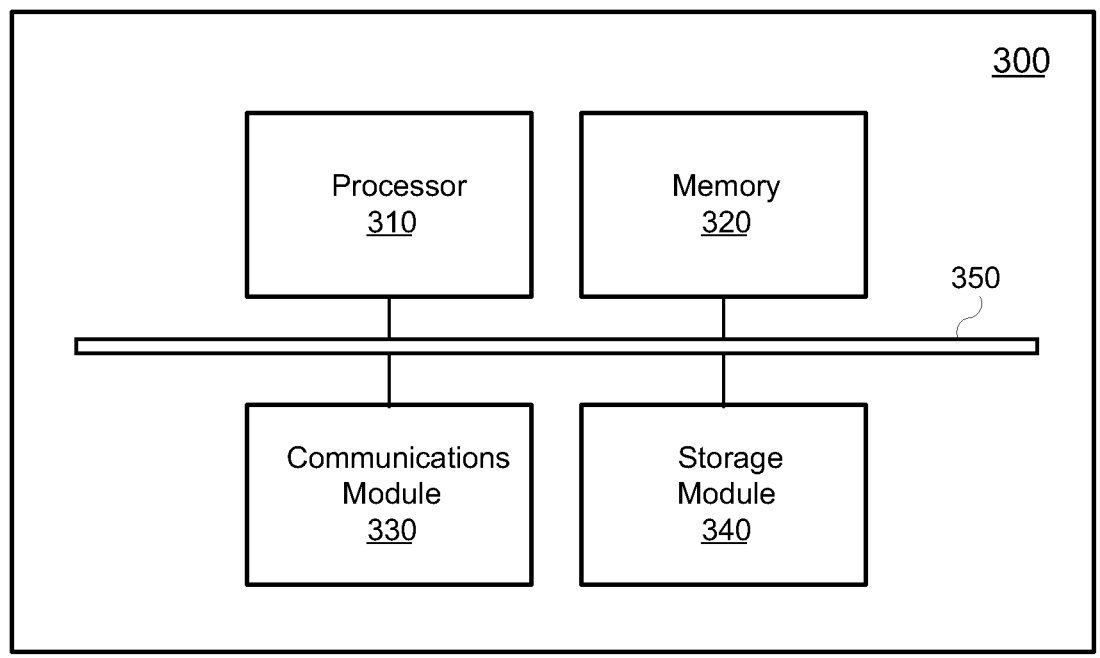
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the application server 130, the healthcare data server 150 and/or the certificate authority server 160.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
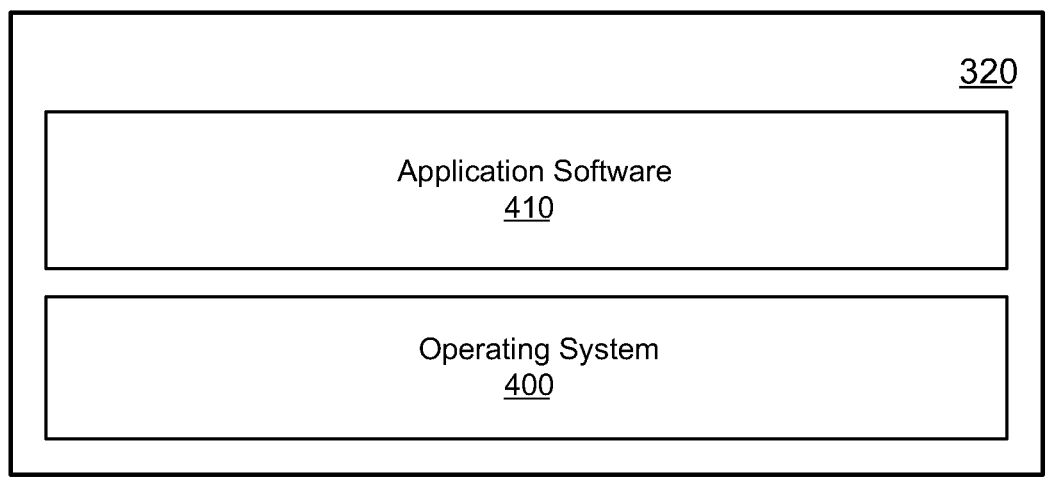
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computing device 240 (FIG. 2) of the user device 110, relying party device 120 or healthcare communication device 155 (FIG. 1), the application server 130, the healthcare data server 150 and the certificate authority server 160. While a single application 410 is illustrated in FIG. 3, in operation the memory 320 may include more than one application 410 and different applications 410 may perform different operations. For example, in at least some embodiments in which the computer device 300 is functioning as the user device 110, the relying party device 120 and/or the healthcare communication device 155, the applications 410 may include a health passport application. For example, where the health passport application is executing on the user device 110, the user may use the health passport application to request a certificate such as for example an immunisation certificate.

Embodiments of operations performed when the health passport application is executing on the user device 110, the relying party device 120 and/or the healthcare communication device 155 will now be described.

Figure 5:
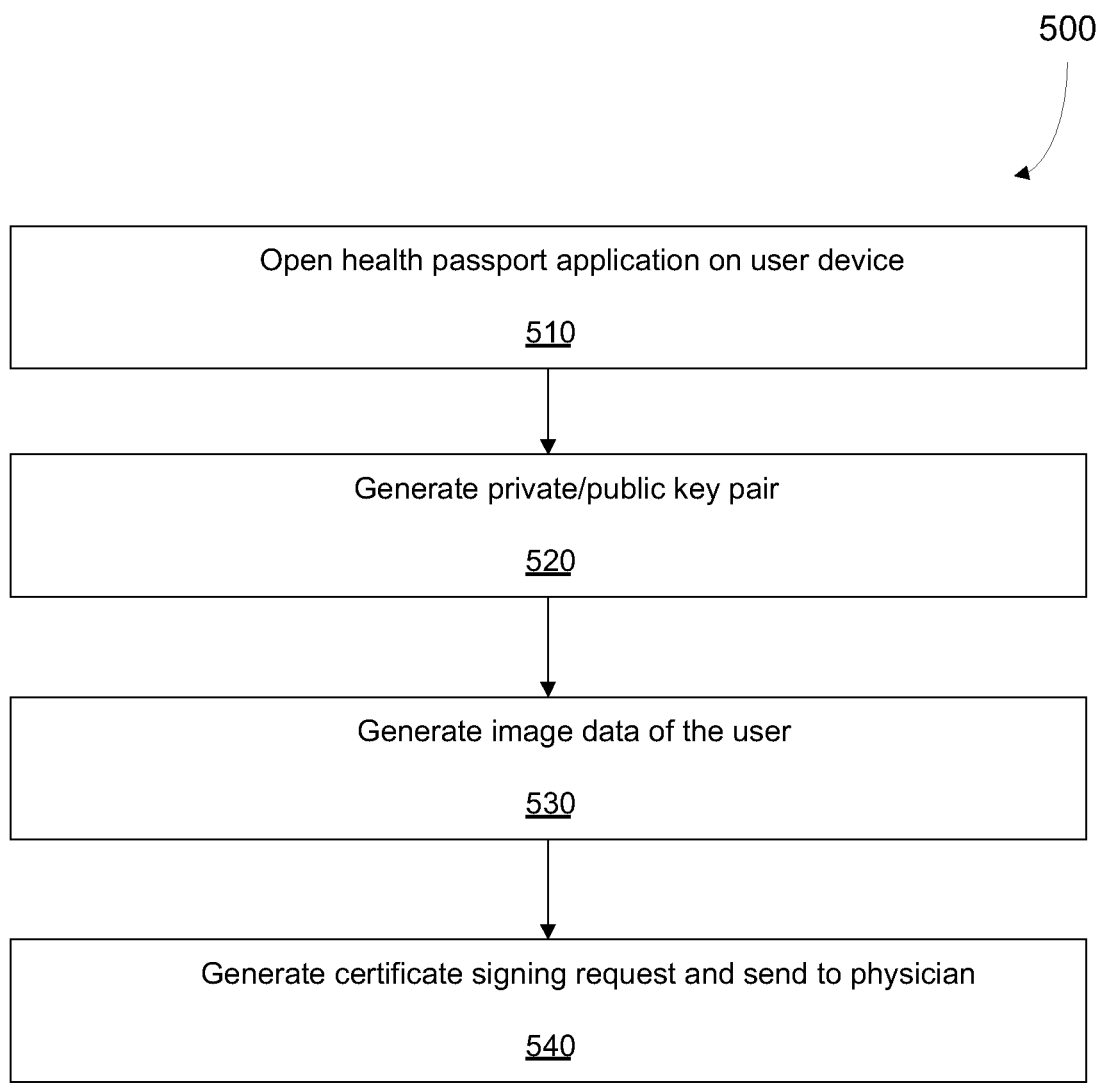
FIG. 5 is a flowchart showing operations performed in generating a certificate signing request, according to an embodiment.

FIG. 5 is a flowchart showing operations performed according to an embodiment. The operations may be included in a method 500 which may be performed by the user device 110. For example, computer-executable instructions stored in memory of the user device 110 may, when executed by a processor user device 120, configure the user device 110 to perform the method 500 or a portion thereof.

The method 500 begins when the user opens or launches the health passport application on the user device 110 (step 510). In this embodiment, the user may wish to open or launch the health passport application prior to visiting their physician or at the time they are visiting their physician.

The health passport application may be opened or launched via input such as touch input made on a display screen of the user device 110. In response, the user device 110 opens up a graphical user interface associated with the health passport application.

Once launched, the user initiates a certificate signing request and in response the health passport application causes a private key and a public key pair to be generated (step 520). In an embodiment, the private key and public key pair may be generated by the health passport application. In another embodiment, the private and public key pair could be generated either by the application or could be generated within a hardware module that can handle cryptographic keys (such as a Secure Enclave which is a hardware-based key manager that is isolated from a main processor of the user device 110). Use of the private key and public key pair will be described in more detail below.

Data in the form of image data is generated of the user (step 530). In this embodiment, the image data includes an image of the user (non-obscured, non-obfuscated or non-deformed) and a corresponding obscured, obfuscated or deformed image of the user. The image of the user may be obtained from an image library associated with the user device 110 or may be obtained using the image capture module 220 of the user device 110. The image may be for example a picture or a portrait of a face of the user.

Once the image of the user has been obtained, a corresponding obscured, obfuscated or deformed image of the user may be generated. In this embodiment, the corresponding obscured image of the user may be generated using one or more image obscuring, obfuscating or deforming methods and applying the one or more image obscuring, obfuscating or deforming methods to the image of the user. Exemplary obscuring, obfuscating or deforming methods include one or more of pixilation, blurring, obscuring, overlaying, applying a distortion effect via a filter, etc.

Figure 6:
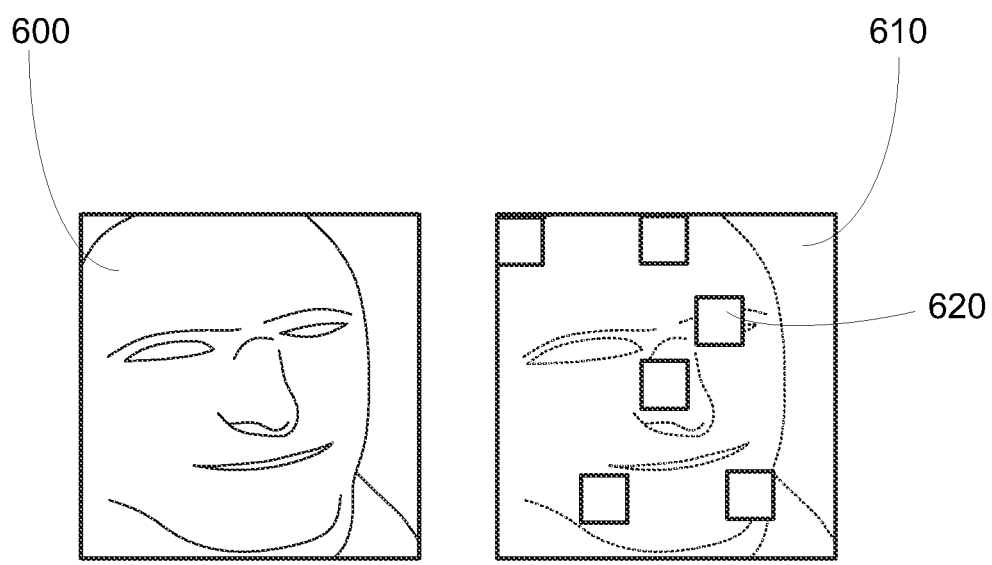
FIG. 6 shows an example image of a user and a corresponding obscured image of the user, according to an embodiment.

FIG. 6 shows an example image 600 and corresponding obscured image 610 of a user. In this example, the corresponding obscured image 610 is a blurred version of the image 600 and includes overlaid features 620.

Figure 7:
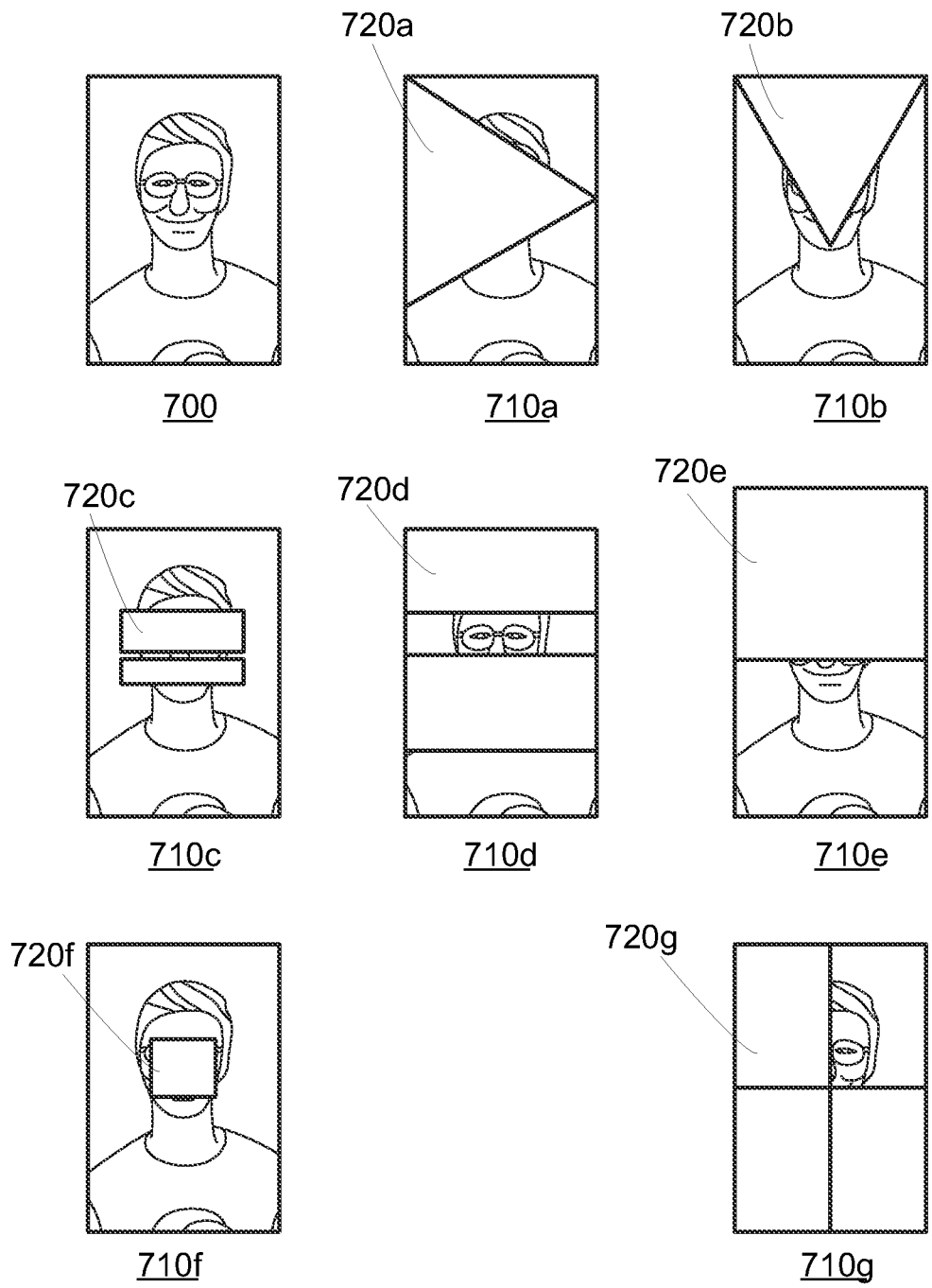
FIG. 7 shows another example image of a user and corresponding obscured images of the user, according to an embodiment.

FIG. 7 shows an example image 700 and corresponding obscured images 710a, 710b, 710c, 710d, 710e, 710f and 710g of a user. In these examples, the corresponding obscured images 710a, 710b, 710c, 710d, 710e, 710f and 710g are the same as image 700 with the addition of overlaid features 720a, 720b, 720c, 720d, 720e, 720f and 720g, respectively.

Once the image data of the user has been generated, a hash of the corresponding obscured image of the user may be generated. In this embodiment, the hash of the corresponding obscured image of the user is signed using the private key generated during step 510. As mentioned, in another embodiment the health passport application may access a Secure Enclave or similar type or processor to perform the signature with the private key.

Once the image data of the user has been obtained, the certificate signing request is sent to the healthcare communication device 155 associated with the physician (step 540). In this embodiment, the certificate signing request may be for example a request for an immunisation certificate, a request for a vaccination certificate, etc. Put another way, the certificate signing request may be a request for an updated health status of the user based on an upcoming or currently occurring visit to the physician.

The request may be sent to the healthcare communication device 155 via the network 140. In this embodiment, the certificate signing request includes the signed hash of the corresponding obscured photo, the public key and the corresponding obscured photo. The certificate signing request also includes information related to the health status of the user. For example, the certificate signing request may identify one or more immunisations or vaccinations. Where an immunisation is identified, the certificate signing request may be a request for an immunisation certificate. Similarly, where a vaccination is identified, the certificate signing request may be a request for a vaccination certificate.

Figure 8:
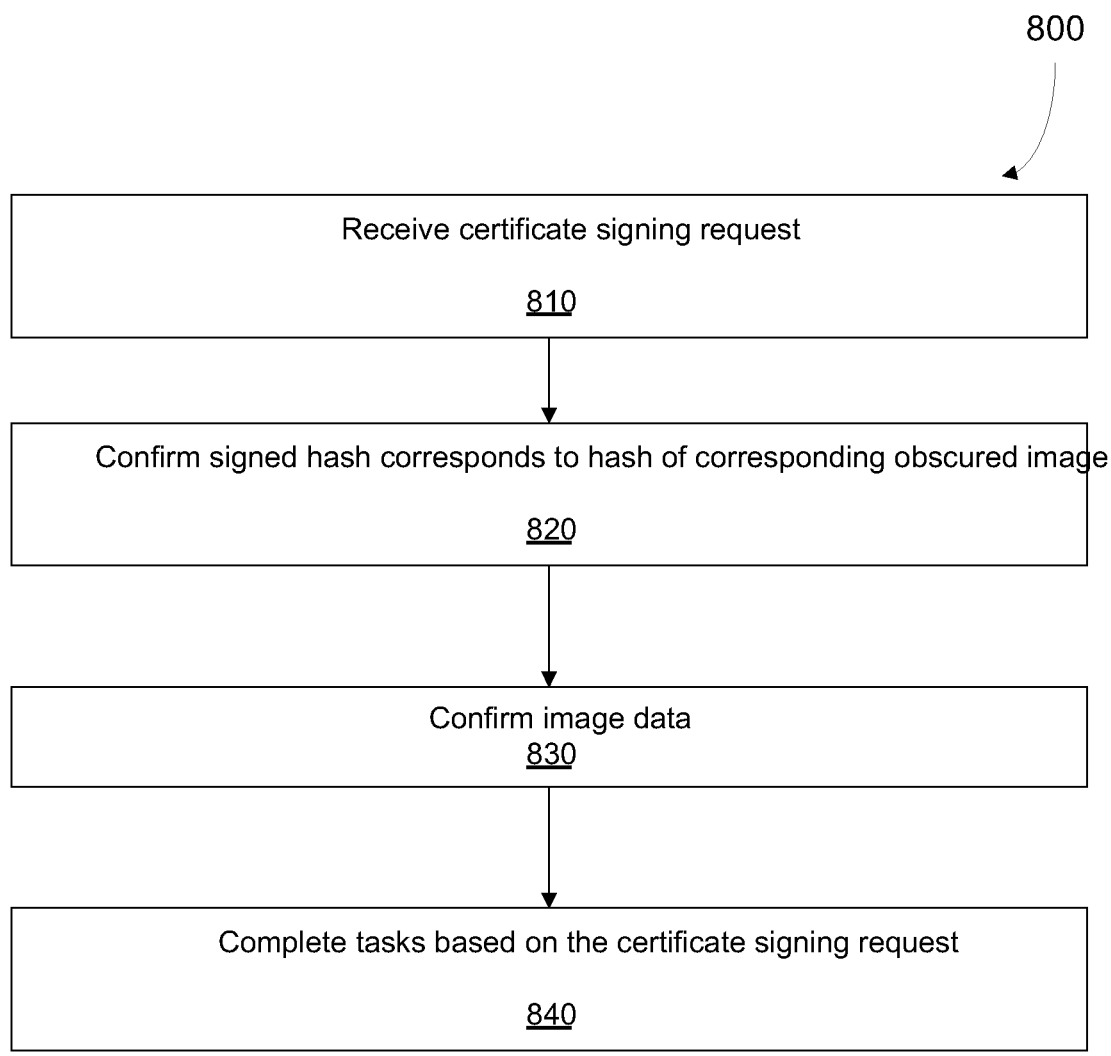
FIG. 8 is a flowchart showing operations performed in completing a certificate signing request, according to an embodiment.

The healthcare communication device 155 receives the certificate signing request and in response performs operations. FIG. 8 is a flowchart showing operations performed by the healthcare communication device 155 according to an embodiment. The operations may be included in a method 800 which may be performed by the healthcare communication device 155. For example, computer-executable instructions stored in memory of the healthcare communication device 155 may, when executed by a processor of the healthcare communication device 155, configure the healthcare communication device 155 to perform the method 800 or a portion thereof.

The method begins when the certificate signing request is received from the user device 110 (step 810). As mentioned, the certificate signing request includes the signed hash of the corresponding obscured photo, the public key and the corresponding obscured photo. The certificate signing request also includes information related to the health status of the user. The signed hash is compared to the hash of the corresponding obscured image, and a verification of the signature is performed by using the received public key to confirm authenticity of the corresponding obscured image (step 820).

The image data is confirmed to be image data of the user (step 830). In this embodiment, the image of the user is displayed by the user on the user device 110 and this displayed image is shown to the physician to ensure it is indeed an image of the user. The corresponding obscured image is displayed on the healthcare communication device 155 and the physician confirms that the corresponding obscured image indeed corresponds to the non-obscured image of the user.

Once the hash and image data of the user are confirmed, it is determined that the user is indeed the user shown in the images and as such the physician completes one or more tasks based on the certificate signing request received from the user device 110 (step 840). For example, where the certificate signing request is a request for an immunisation certificate, the physician may obtain a sample such as a blood sample and send the sample out for analysis. In this example, a third party may be relied upon to analyze the sample and the results of the analysis may be communicated to the healthcare data server 150. Where the certificate signing request is a request for a vaccination certificate, the physician may inject the user with one or more vaccines.

Once the physician has completed the one or more tasks based on the certificate signing request, the physician may use the healthcare communication device 155 to provide information to the healthcare data server 150. For example, where the certificate signing request is a request for a vaccination certificate, the physician may provide information indicating that the user has been vaccinated.

Once information has been provided by the physician, the healthcare data server 150 generates a unique certificate identification number for the certificate signing request and updates a corresponding medical record of the user to update the health status of the user. For example, where the certificate signing request is a request for a vaccination, the medical record of the user is updated to indicate the type of vaccinations the user has received from the physician. The medical record may also be updated to include the date of the vaccination and/or an expiration date for the vaccination. The medical record is also updated to include the certificate identification number.

In some embodiments, such as for example where a third party is relied upon to analyze a sample obtained from the user, the medical record of the user may be updated before receiving the results from the third party. As such, the medical record may be updated to indicate that the user is awaiting results and the medical record may be updated once the test results are received.

Once the medical record has been updated, the unique certificate identification number is communicated to the physician and this may be done via the healthcare communication device 155. The healthcare communication device 155 may in-turn communicate the unique certificate identification number to the user device 110 where it is stored in memory. In at least some embodiments, the unique certificate identification number may only be provided to the user device 110 when the signed hash is validated.

The certificate signing request is sent by the healthcare communication device 155 to the certificate authority server 160. The certificate signing request includes the certificate identification number, the public key, the hash of the associated obscured image and information regarding the health status of the user. For example, where the certificate signing request is a request for a vaccination certificate, the certificate signing request includes information indicating that the user has been vaccinated for a particular disease. The certificate signing request may include the date the user has been vaccinated and may include an expiration date for the vaccination. As another example, where the certificate signing request is a request for an immunisation certificate, the certificate signing request may include the immunisation status of the user (immune/not immune), a start date of immunisation status, an end date of immunisation status, and one or more diseases for which the user has been determined to be immune.

Once received, the certificate authority server 160 analyzes the certificate signing request to generate or otherwise sign the requested certificate. Specifically, the certificate authority server 160 performs a check to determine that the RA is authorized and authentic and that the attributes are valid. For example, the certificate authority server 160 may determine, based on information included with the certificate signing request, that the RA is a trusted partner. The certificate authority server 160 may also ensure compliance with the public key infrastructure (PKI) policy, etc. When it is determined that the RA is authorized and authentic, it is assumed that the health status data is valid and as such the certificate authority server 160 generates or otherwise signs the requested certificate. It will be appreciated that the health status data is assumed to be valid in that the health status data represented an accepted and allowable set of health related attributes and may also mean that the values of any such attributes fall within an accepted and allowable range. The certificate includes the certificate identification number, the public key, the hash of the associated obscured image and information regarding the health status of the user. For example, where the certificate signing request is a request for an immunisation certificate, the certificate includes the immunisation status of the user (immune/not immune), a start date of immunisation status, an end date of immunisation status, and one or more diseases for which the user has been determined to be immune. As another example, where the requested certificate is a request for a vaccination certificate, the certificate includes information indicating that the user has been vaccinated for a particular disease. The certificate signing request may also include the date the user has been vaccinated and may include an expiration date for the vaccination.

Once generated, the certificate authority server 160 sends the certificate to the application server 130. The certificate authority server 160 does not store any identification information of the user. Rather, the certificate authority server 160 confirms the authenticity of the RA, generates the requested certificate and sends the certificate to the application server 130.

The application server 130 receives the certificate and stores the certificate in memory. The application server 130 sends a notification to the healthcare communication device 155 that causes the healthcare communication device 155 to display a message indicating that the certificate is available. The physician may then send a notification from the healthcare communication device 155 to the user device 110 causing the user device 110 to display a message indicating that the certificate is available. In another embodiment, the certificate may automatically be obtained by the user device 110 such as for example through the health passport application and a message may be displayed to the user indicating that the certificate has been retrieved.

Figure 9:
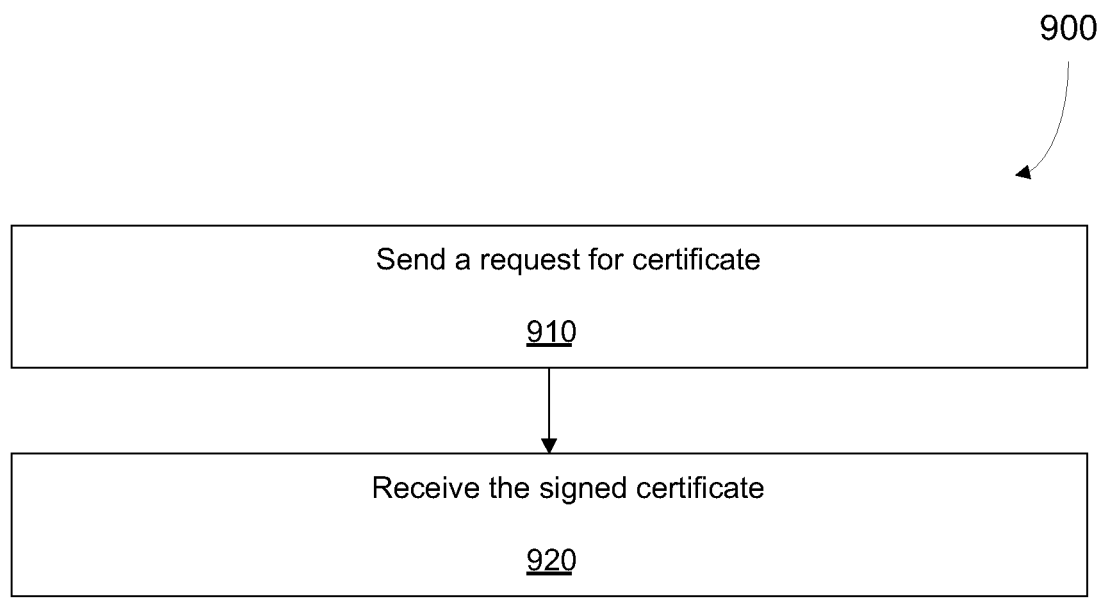
FIG. 9 is a flowchart showing operations performed in obtaining a signed certificate, according to an embodiment.

The user may now request the certificate from the application server 130. FIG. 9 is a flowchart showing operations performed by user device 110 in obtaining the certificate according to an embodiment. The operations may be included in a method 900 which may be performed by user device 110. For example, computer-executable instructions stored in memory of the user device 110 may, when executed by a processor of the user device 110, configure the user device 110 to perform the method 900 or a portion thereof.

The user device 110 sends, to the application server 130, a request for the certificate (step 910). In this embodiment, the request may include the certificate identification number and this may be signed or encrypted with the private key. The request for the certificate may include either the public key of the user or a hash of the public key of the user. For example, in another embodiment, the request may be based on the public key and a lookup may be performed to determine the appropriate certificates using the public key or a hash of the public key, where the public key and/or hash of the public key is provided to the application server 130 by the user device 110. To ensure the user device 110 is in possession of the private key, a string, timestamp or other identifying code may be signed with the private key and sent.

The application server 130 receives the request. The application server 130 obtains the requested certificate, using the certificate identification number, and performs a check to determine that elements of the request provided by the user device 110 that were signed or encrypted using the private key are valid for the particular public key. When it is determined that the elements of the request were correctly signed or encrypted, the certificate is sent to the user device 110.

The user device 110 receives the certificate from the application server 130 (step 920). As mentioned, the certificate includes the certificate identification number, the public key, the hash of the associated obscured image and information regarding the health status of the user. For example, where the certificate signing request is a request for an immunisation certificate, the certificate includes the immunisation status of the user (immune/not immune), a start date of immunisation status, an end date of immunisation status, and one or more diseases for which the user has been determined to be immune. As another example, where the requested certificate is a request for a vaccination certificate, the certificate includes information indicating that the user has been vaccinated for a particular disease. The certificate signing request may also include the date the user has been vaccinated and may include an expiration date for the vaccination. The certificate may be stored in memory of the user device 110.

When a user wishes to enter a public event or building, the relying party may wish to check if the user is healthy. For example, the relying party may wish to confirm that the user does not have a particular disease. The certificate may be used by the user to gain entry into the public event.

Figure 10:
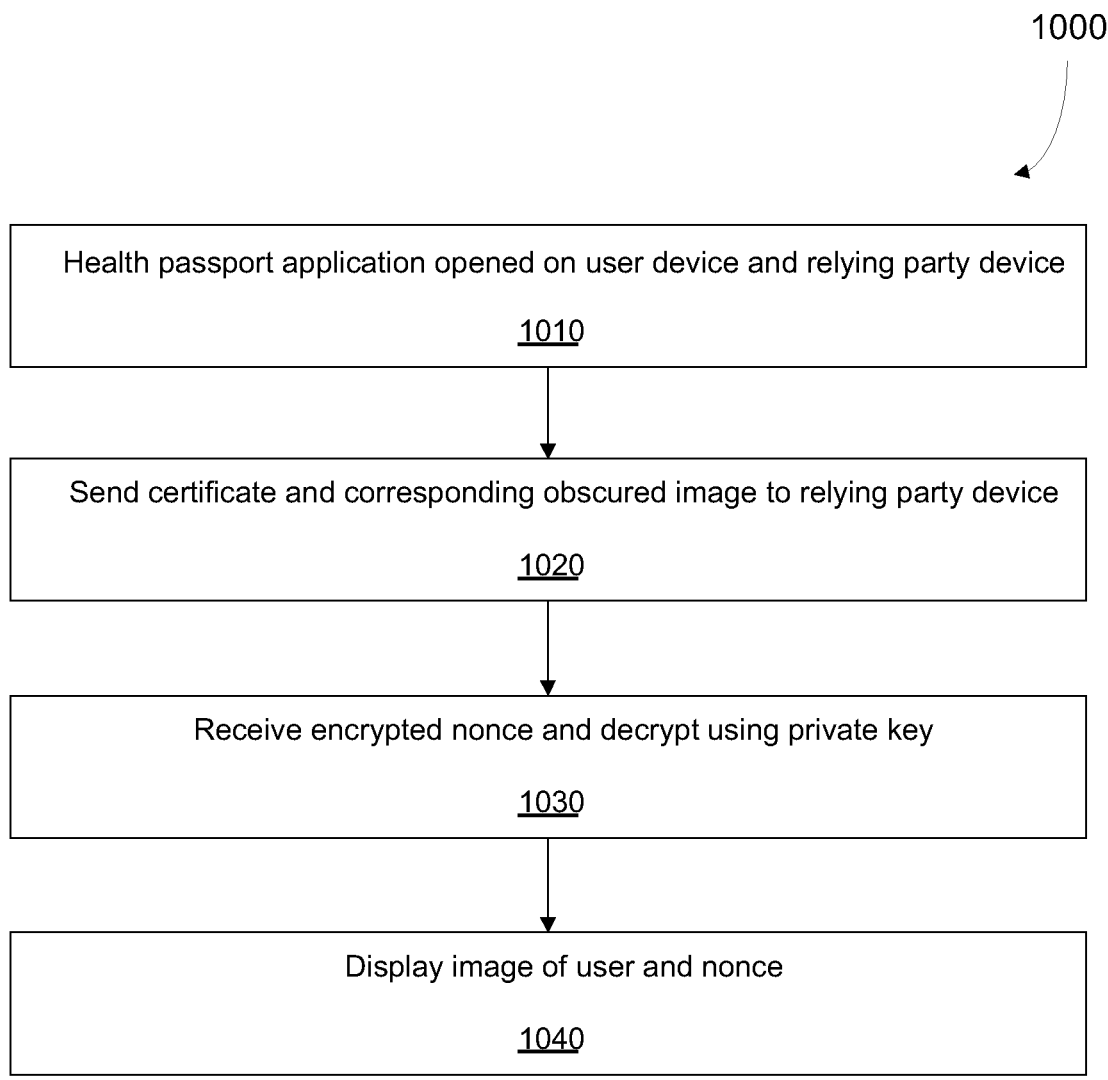
FIG. 10 is a flowchart showing operations performed in displaying an image of a user, according to an embodiment.

FIG. 10 is a flowchart showing operations performed by the user device 110 in providing a signed certificate to a relying party device 120 according to an embodiment. The operations may be included in a method 1000 which may be performed by the user device 110. For example, computer-executable instructions stored in memory of the user device 110 may, when executed by a processor of the user device 110, configure the user device 110 to perform the method 1000 or a portion thereof.

The relying party may verbally request that the user prove their health status prior to allowing them to entry the public event or building. As such, the method 1000 begins when the health passport application is opened on the user device 110 and the relying party device 120 (step 1010). In this embodiment, the user device 110 and the relying party device 120 are paired using Bluetooth and/or peer-to-peer discovery. It will be appreciated that in other embodiments the user device 110 and the relying party device 120 may be paired using other techniques such as through the use of QR codes Once paired, the user device 110 sends the signed certificate and the corresponding obscured image of the user to the relying party device 120 (step 1020). Prior to sending the certificate and the corresponding obscured image of the user, a prompt may be displayed on the user device 110 asking the user to confirm that they would like to share this information with the relying party.

The corresponding obscured image of the user may be encrypted using the private key generated during method 500. The current time may also be sent to the relying party device 120 and may be signed using the private key.

In response to receiving the certificate, the corresponding obscured image of the user, and the current time, the relying party device 120 may check that the current time received from the user device 110 is indeed the current time. The relying party device 120 then determines that the certificate is valid in that the certificate has been correctly signed by the certificate authority and has not expired. Once it is determined that the current time is indeed the current time and that the certificate is valid, the relying party device 120 may generate a nonce. The nonce may be encrypted using the public key and may be sent to the user device 110.

The user device 110 receives the encrypted nonce and decrypts the nonce using the private key (of the public key and private key pair) (step 1030).

Figure 11:
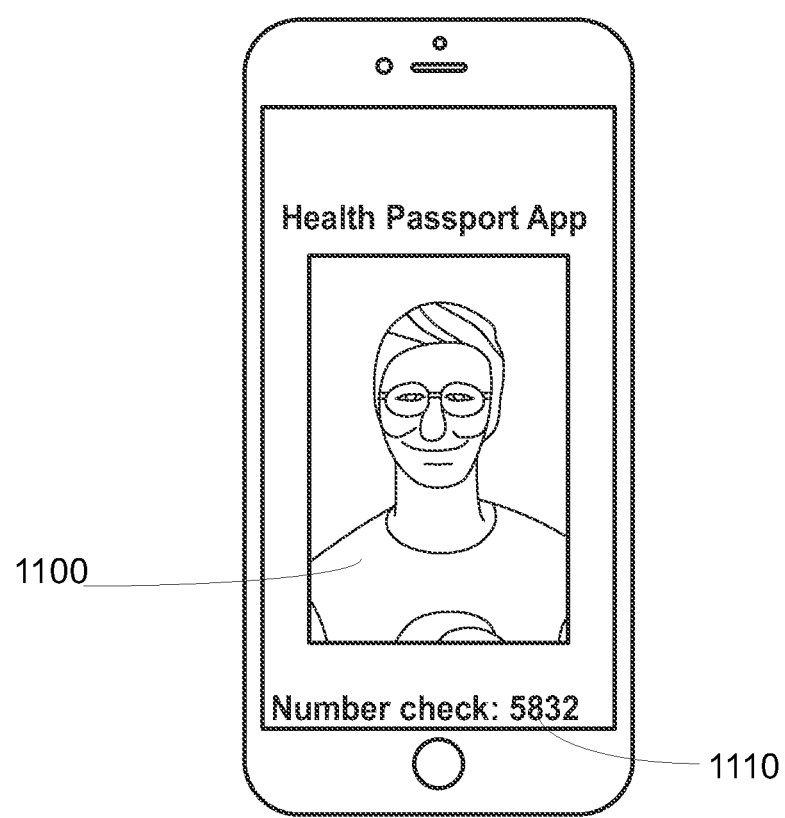
FIG. 11 is an example image of a user including a nonce, according to an embodiment.

Once the nonce is decrypted, the user device 110 displays the image of the user along with the nonce (step 1040). In this embodiment, the nonce is displayed on the user device 110 below the image of the user. An example is shown in FIG. 11. As can be seen, an image 1100 of the user is displayed as well as nonce 1110. In another example, the nonce may be displayed such that it overlaps with the image of the user. In another example, the nonce may be displayed in a particular location with respect to the image of the user and/or in a particular location on the display screen of the user device 110. For example, the nonce may be displayed in the bottom right corner. In another example, the nonce may be displayed at a random location on the display screen of the user device 110.

Figure 12:
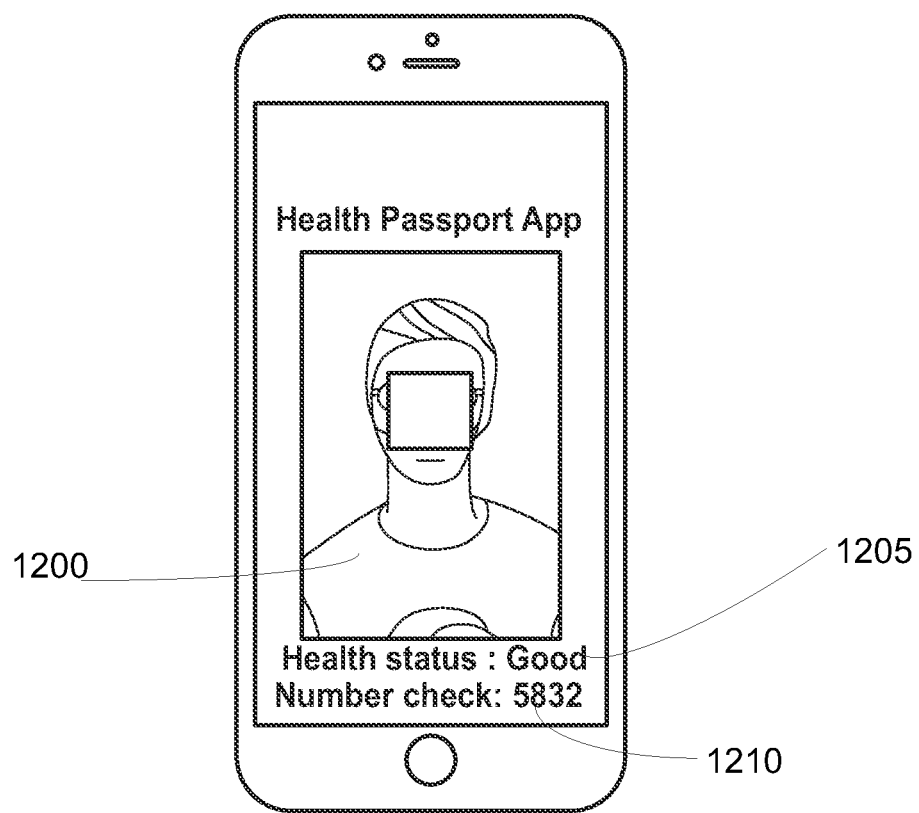
FIG. 12 is an example corresponding obscured image of a user including a nonce, according to an embodiment.

After sending the nonce to the user device 110, the relying party device 120 decrypts the corresponding obscured image of the user. The corresponding obscured image of the user is then displayed on the relying party device 120 along with the information indicating the heath status of the user. The nonce is also displayed on the relying party device 120 and may be, for example, positioned below the corresponding obscured image of the user. An example is shown in FIG. 12. As can be seen, a corresponding obscured image 1200 of the user is displayed as well as the information indicating the health status of the user 1205 and the nonce 1210. The nonce may be, for example, displayed on a display screen of the relying party device 120 at the same location as it is displayed on the display screen of the user device 110. The relying party may compare the nonce displayed on the user device 110 and the nonce displayed on the relying party device 120 to determine that they are the same value and are positioned in the same location. If the nonces are not displayed in the same location, the relying party may determine that the user is not who they say they are and may refuse the user entry.

The relying party then checks the image of the user (displayed on the user device 110) to ensure that the face of the user presenting the user device 110 corresponds to that of the image that is presented on the user device 110. The relying party then checks the corresponding obscured image of the user to ensure that the corresponding obscured image of the user, provided on the relying party's device, indeed corresponds to the non-obscured image of the user as presented on the user device 110. The relying party then checks that the nonce displayed on the user device 110 matches the nonce displayed on the relying party device 120. The relying party then checks the information indicating the health status of the user to ensure that the user is allowed to enter. For example, the relying party checks to see that the user has been vaccinated or is immune to a particular disease and thus is granted entry.

The nonce may include or may be a code such as for example a six (6) digit code. The nonce may be overlaid on top of the obscured image displayed on the relying party device and the nonce may be overlaid on top of the non-obscured image displayed on the user device. In one or more embodiments, each time the obscured image or non-obscured image are displayed, the nonce may be overlaid in a random location. In another embodiment, the nonce may be displayed on the relying party device in a manner such that the location may be controlled by the relying party. The nonce displayed on the user device may be adjusted based on the actions performed by the relying party. For example, the relying party may select the nonce via touch input on the display screen of the relying party device. The relying party may perform a gesture by moving their finger in a particular pattern and in response the location of the nonce may be updated accordingly. The nonce on the user device may follow the movement of the nonce to ensure that the user device and thus the user are legitimate. In another embodiment, both the nonce and the image may be moved via touch input. In another embodiment, the nonce and/or the image may be moved automatically on the relying party device and the user device. The movement may be, for example, random movement. In another embodiment, the relying party device may be moved and in response the nonce and/or the image may be moved. For example, movement of the relying party device may be detected via one or more sensors of the relying party device. When it is determined that the relying party device is moving, the location of the nonce and/or the image may be updated. It will be appreciated that rather than monitoring input and/or movement of the relying party device, the user device may be monitored and the location of the nonce and/or image may be updated accordingly on the user device and/or relying party device.

In this manner, it is difficult for a user to imitate or pretend to have a valid health passport as it is difficult for the user to overlap a photo on top of an image displayed by a valid health passport application on a user device. Put another way, a user cannot simply pretend to have a valid health passport by overlaying their image on someone else's valid health passport.

Figure 13:
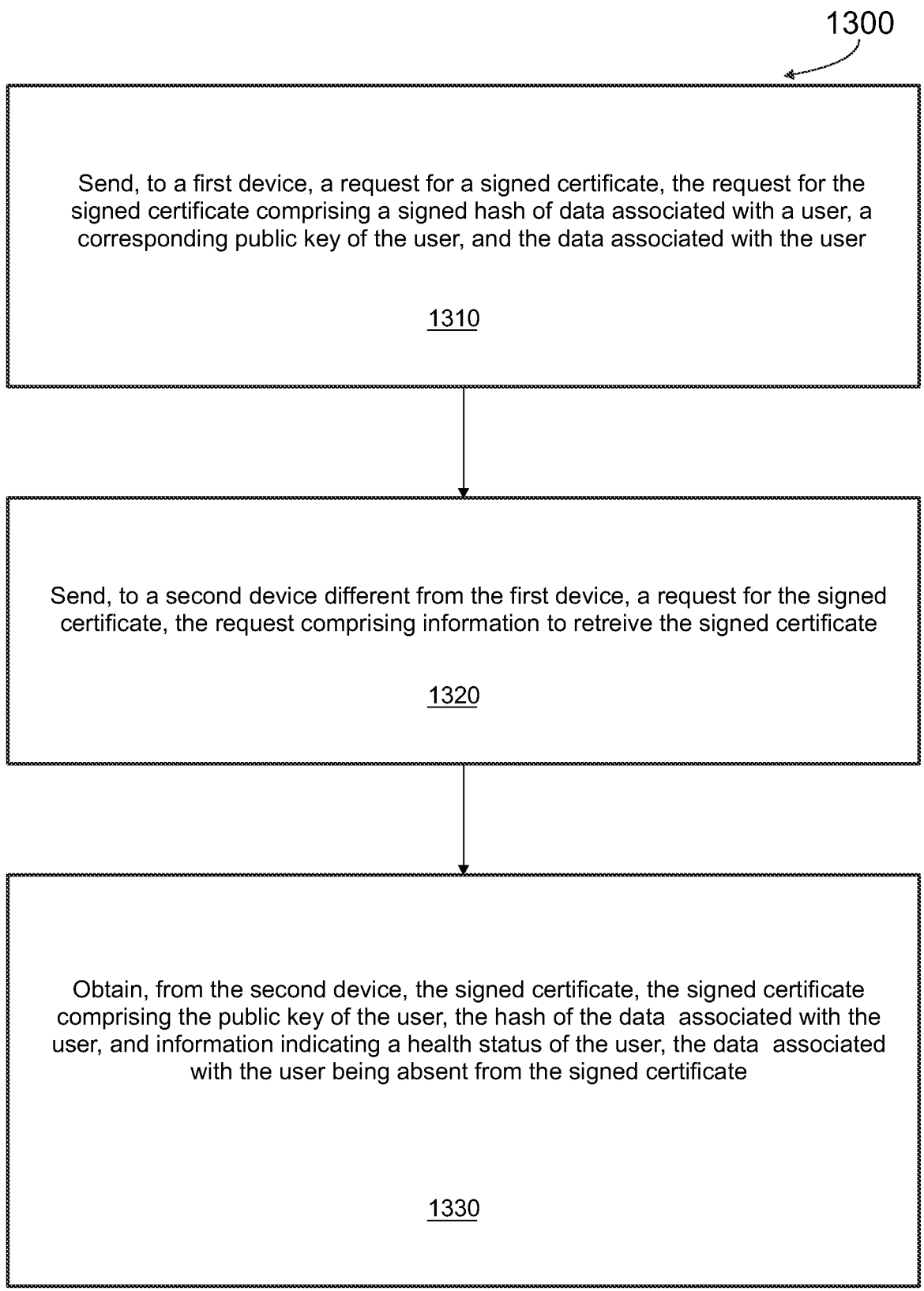
FIG. 13 is a flowchart showing operations performed in obtaining a signed certificate, according to an embodiment.

FIG. 13 is a flowchart showing operations for obtaining a signed certificate according to another embodiment. The operations may be included in a method 1300 which may be performed by the user device 110. For example, computer-executable instructions stored in memory of the user device 110 may, when executed by a processor user device 120, configure the user device 110 to perform the method 1300 or a portion thereof.

The user device 110 sends, to a first device, a request for a signed certificate, the request for the signed certificate comprising a signed hash of data associated with a user, a corresponding public key of the user, and the data associated with the user (step 1310). In this embodiment, the first device may include the healthcare communication device 155 and/or the healthcare data server 150 and the first device may be caused to perform one or more steps to obtain or otherwise generate a certificate in manners similar to that described herein. The data associated with the user may correspond to partial personally identifiable information. The partial personally identifiable information may correspond to information available on an identity document of the user such as a personal identity card.

The user device 110 sends, to a second device different than the first device, a request for the signed certificate, the request comprising information to retrieve the signed certificate (step 1320). The second device may include the certificate authority server 160 and the second device may be caused to perform one or more steps to obtain or otherwise generate a signed certificate in manners similar to that described herein.

The user device 110 obtains, from the second device, the signed certificate, the signed certificate comprising the public key of the user, the hash of the data associated with the user, and information indicating a health status of the user, the data associated with the user being absent from the signed certificate (step 1330). As mentioned, the second device may include the certificate authority server 160 which may be caused to perform one or more steps to obtain or otherwise generate the signed certificate.

In embodiments described herein, limited or non-identifying personal information about the user is not shared with the relying party or the relying party device. Put another way, the information shared with the relying party or the relying party device would be insufficient for a recipient to associate an identity of the user with the personal health data. Only an obscured image of the user and a signed certificate are shared with the relying party. Further, the relying party has improved confidence that the user is indeed the user associated with the certificate by generating the nonce and sending the nonce in an encrypted manner. Further, the relying party can ensure the user is indeed the user associated with the certificate by ensuring that the nonce is displayed on a display screen of the relying party device 120 at the same location as it is displayed on the display screen of the user device 110.

In one or more embodiments, additional data may be shared with the relying party device to increase the relying party's confidence that the information on the health passport corresponds to or is associated with the user presenting the user device 110. For example, biometric data such as a height, weight, eye colour, gender, age, etc. of the user may be shared and may be displayed on the relying party device. This may further help the relying party confirm that the certificate is truly associated with the user that is presenting the user device. The additional data may be shared as a range of data. For example, the additional data may indicate that the user is between 180 lbs and 200 lbs.

In one or more embodiments, the relying party may require additional identification methods to confirm that the certificate is truly associated with the user that is presenting the user device. For example, the relying party may request a personal identification card such as for example a driver's license or passport of the user. Information obtained from the personal identification card may be compared to that included with the signed certificate to further confirm that the certificate is truly associated with the user that is presenting the user device.

In one or more embodiments, multiple signed certificates may be obtained by the user. For example, a first signed certificate may be an immunisation certificate and may include the immunisation status of the user, a corresponding obscured image of the user, and a public key. A second signed certificate may include the immunisation status of the user, the full legal name of the user, and a date of birth of the user. A third signed certificate may include the immunisation status of the user, a partial name of the user (such as a first name of the user), and a partial date of birth of the user (such as the year of birth of the user). The user may select which signed certificate to provide to the relying party device. Alternatively, the relying party may request particular information regarding the user and the user device may receive a prompt requesting confirmation that the user device may share the requested information with the relying party via the relying party device. For example, the relying party may request the day of the month the user was born and the immunisation status of the user. The user may receive a prompt on the user device requesting confirmation that the user device can provide this information to the relying party device. When the user grants permission, the requested information may be provided to the relying party device.

Figure 14:
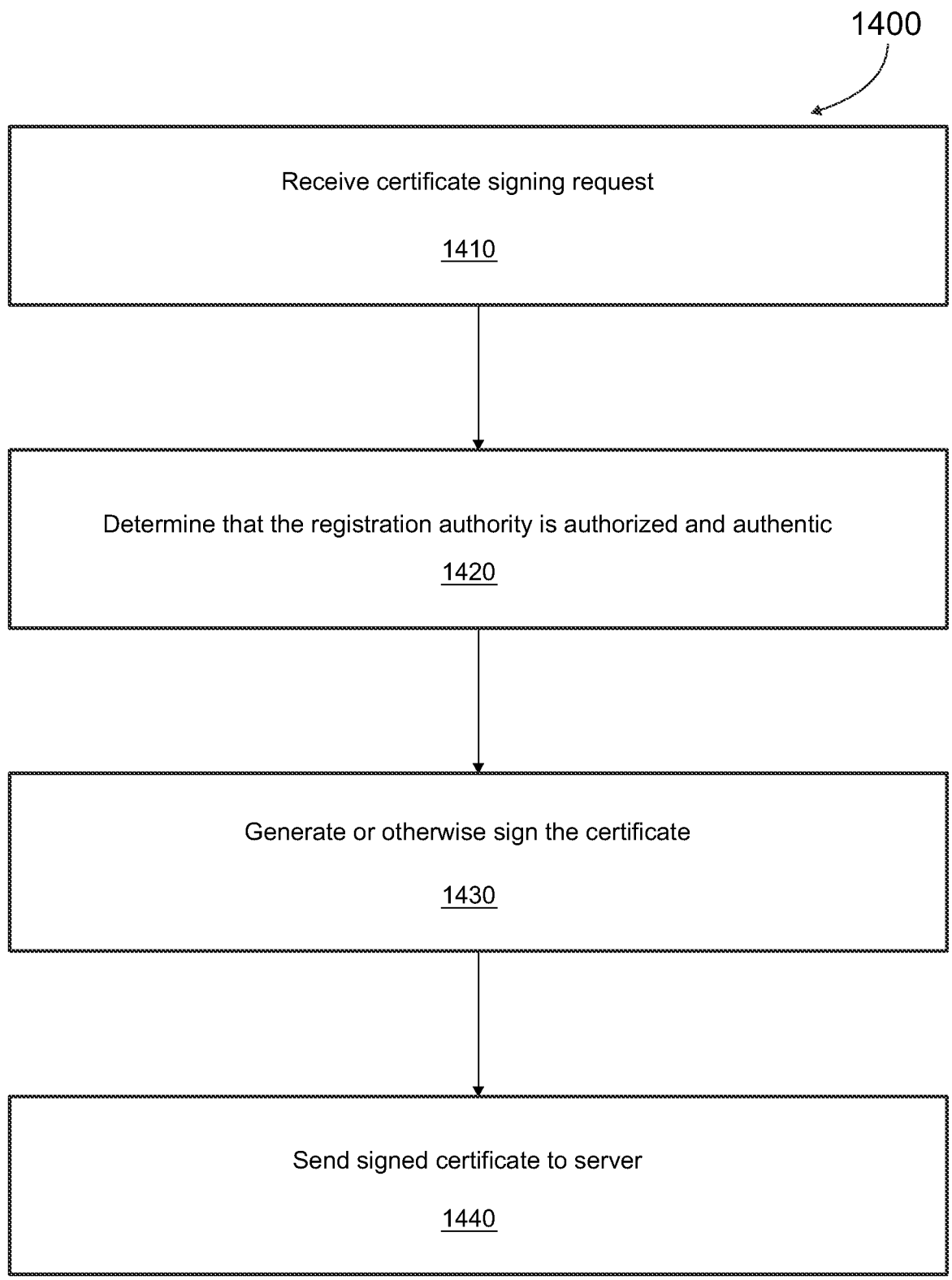
FIG. 14 is a flowchart showing operations performed in signing a certificate according to an embodiment.

In embodiments described above, the certificate authority server 160 is described as generating or otherwise signing a requested certificate. FIG. 14 is a flowchart showing operations performed by the certificate authority server 160 in generating or otherwise signing a requested certificate according to an embodiment. The operations may be included in a method 1400 which may be performed by the certificate authority server 160. For example, computer-executable instructions stored in memory of the certificate authority server 160 may, when executed by a processor of the certificate authority server 160, configure the certificate authority server 160 to perform the method 1400 or a portion thereof.

The certificate authority server 160 receives, from the healthcare communication device or healthcare server, a certificate signing request (step 1410). In this embodiment, the certificate signing request includes the certificate identification number, the public key, the hash of the associated obscured image and information regarding the health status of the user.

The certificate authority server 160 determines that the registration authority (RA) is authorized and authentic (step 1420). In this embodiment, the certificate authority server 160 identifies and authenticates the RA based on information provided with the certificate signing request. The certificate authority server 160 may have access to a whitelist that includes trusted registration authorities and determined that the RA is indeed included in the whitelist and thus is authorized and authentic.

When it is determined that the RA is authorized and authentic, the certificate authority server 160 generates or otherwise signs the certificate (step 1430). The certificate may include the certificate identification number, the public key, the hash of the associated obscured image and information regarding the health status of the user. For example, where the certificate signing request is a request for an immunisation certificate, the certificate includes the immunisation status of the user (immune/not immune), a start date of immunisation status, an end date of immunisation status, and one or more diseases for which the user has been determined to be immune. As another example, where the requested certificate is a request for a vaccination certificate, the certificate includes information indicating that the user has been vaccinated for a particular disease. The certificate signing request may also include the date the user has been vaccinated and may include an expiration date for the vaccination.

Once generated, the certificate authority server 160 sends the certificate to the application server 130 (step 1440). The certificate authority server 160 does not store any identification information of the user. The certificate authority server 160 confirms the authenticity of the RA, generates the requested certificate and sends the certificate to the application server 130.

Figure 15:
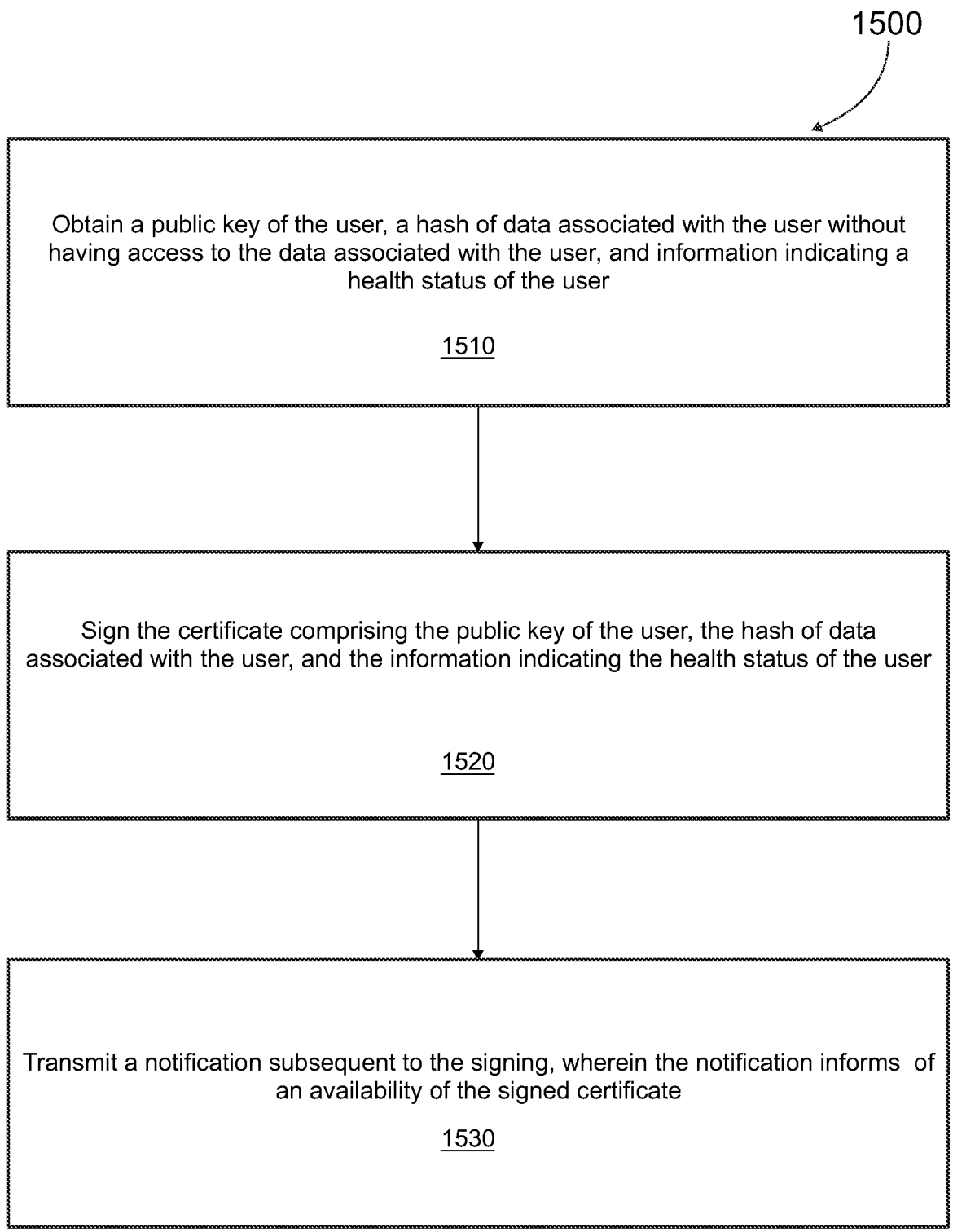
FIG. 15 is a flowchart showing operations performed in signing a certificate, according to an embodiment.

FIG. 15 is a flowchart showing operations performed by the certificate authority server 160 in generating or otherwise signing a requested certificate according to another embodiment. The operations may be included in a method 1500 which may be performed by the certificate authority server 160. For example, computer-executable instructions stored in memory of the certificate authority server 160 may, when executed by a processor of the certificate authority server 160, configure the certificate authority server 160 to perform the method 1500 or a portion thereof.

The certificate authority server 160 obtains a public key of a user, a hash of data associated with the user, without having access to the data associated with the user, and information indicating a health status of the user from a communication with a first device (step 1510). In this embodiment, the first device may be the healthcare communication device or healthcare server described herein. This step may be completed in manners similar to step 1410 described herein.

The certificate authority server 160 signs a certificate comprising the public key of the user, the hash of the data associated with the user, and the information indicating the health status of the user (step 1520). The signing of the certificate delivers a signed certificate where the data associated with the user is absent from the signed certificate. This step may be completed in manners similar to steps 1420 and 1430 described herein.

The certificate authority server 160 transmits, to the first device, a notification subsequent to the signing, wherein the notification informs of an availability of the signed certificate (step 1530). In response, the first device may retrieve the signed certificate in manners similar to that described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer-implemented method comprising:
   sending, to a first device, a request for a signed certificate, the request for the signed certificate comprising a signed hash of data associated with a user, a corresponding public key of the user, and the data associated with the user, the first device sending a certificate signing request to a second device that is different from the first device, the second device signing the requested certificate and sending the signed certificate to an application server, the application server storing the signed certificate and sending, to the first device, an indication that the signed certificate is available that includes a certificate identification number;

receiving, from the first device, the indication that the signed certificate is available that includes the certificate identification number;

sending, to the application server, a request for the signed certificate, the request comprising the certificate identification number; and obtaining, from the application server, the signed certificate, the signed certificate comprising the public key of the user, the hash of the data associated with the user, and information indicating a health status of the user, the data associated with the user being absent from the signed certificate.

2. The computer-implemented method of claim 1, wherein the data associated with the user corresponds to partial personally identifiable information.

3. The computer-implemented method of claim 2, wherein the partial personally identifiable information corresponds to information available on an identity document of the user.

4. The computer-implemented method of claim 1, wherein the data associated with the user corresponds to an obfuscated or deformed image of the user.

5. The computer-implemented method of claim 1, wherein the information to retrieve the signed certificate comprises either the public key of the user or a hash of the public key of the user.

6. The computer-implemented method of claim 1, wherein the data associated with the user and the signed certificate are provided by a user device to a relying party device.

7. The computer-implemented method of claim 6, wherein the relying party device displays the data associated with the user and the information indicating the health status of the user on a display screen thereof.

8. The computer-implemented method of claim 7, wherein the relying party device generates a nonce, displays the nonce on the display screen thereof, and sends the nonce to the user device.

9. The computer-implemented method of claim 8, wherein the nonce is encrypted with the public key of the user by the relying party device.

10. The computer-implemented method of claim 9, wherein the user device decrypts the nonce using a private key of the user associated with the public key of the user, and displays the nonce on a display screen thereof, and wherein when the data associated with a user corresponds to the obfuscated or deformed image of the user, the user device further displays a corresponding non-obfuscated or non-deformed image of the user.

11. The computer-implemented method of claim 8, wherein the nonce is displayed at corresponding locations on the display screens of the relying party device and the user device.

12. The computer-implemented method of claim 1, wherein the information indicating a health status of the user relates to one of an immunisation status or a vaccination status.

13. The computer-implemented method of claim 1, wherein the second device is one of a server comprising signed certificates provided by a certificate authority or a server managed by a certificate authority.

14. The computer-implemented method of claim 1, wherein the unique certificate identification number is received from the first device when the signed hash is validated via a signature verification process.

15. The computer-implemented method of claim 1, wherein the first device is one of a healthcare communication device or a healthcare server.

16. A computer-implemented method performed by a processor of a second device, the method comprising:

receiving, from a first device that is different than the second device, a certificate signing request, the first device receiving a request for a signed certificate that comprises a signed hash of data associated with a user, a corresponding public key of the user, and the data associated with the user;

obtaining the corresponding public key of the user, the signed hash of data associated with the user, without having access to the data associated with the user, and information indicating a health status of the user, from a communication with the first device;

signing a certificate comprising the public key of the user, the hash of the data associated with the user, and the information indicating the health status of the user, the signing delivering a signed certificate, the data associated with the user being absent from the signed certificate; and sending the signed certificate to an application server for storage, the application server sending, to the first device, an indication that the signed certificate is available that includes a certificate identification number and obtaining the signed certificate from the storage in response to receiving a request for the signed certificate that includes the certificate identification number.

17. A system comprising:

at least one processor; and a memory coupled to the at least one processor and storing instructions that, when executed by the at least one processor, configure the at least one processor to:

send, to a first device, a request for a signed certificate, the request for the signed certificate comprising a signed hash of data associated with a user, a corresponding public key of the user, and the data associated with the user, the first device sending a certificate signing request to a second device that is different from the first device, the second device signing the requested certificate and sending the signed certificate to an application server, the application server storing the signed certificate and sending, to the first device, an indication that the signed certificate is available that includes a certificate identification number;

receive, from the first device, the indication that the signed certificate is available that includes the certificate identification number;

send, to the application server, a request for the signed certificate, the request comprising the certificate identification number; and obtain, from the application server, the signed certificate, the signed certificate comprising the public key of the user, the hash of the data associated with the user, and information indicating a health status of the user, the data associated with the user being absent from the signed certificate.

18. A system comprising:

at least one processor of a second device; and a memory coupled to the at least one processor and storing instructions that, when executed by the at least one processor, configure the at least one processor of the second device to:

- receive, from a first device that is different than the second device, a certificate signing request, the first device receiving a request for a signed certificate that comprises a signed hash of data associated with a user, a corresponding public key of the user, and the data associated with the user;
- obtain the corresponding public key of the user, the signed hash of data associated with the user, without having access to the data associated with the user, and information indicating a health status of the user, from a communication with the first device;
- sign a certificate comprising the public key of the user, the hash of the data associated with the user, and the information indicating the health status of the user, the signing delivering a signed certificate, and the data associated with the user being absent from the signed certificate; and
- send the signed certificate to an application server for storage, the application server sending, to the first device, an indication that the signed certificate is available that includes a certificate identification number and obtaining the signed certificate from the storage in response to receiving a request for the signed certificate that includes the certificate identification number.

\* \* \* \* \*